US012577933B2

(12) United States Patent
Bøttcher et al.

(10) Patent No.: US 12,577,933 B2
(45) Date of Patent: Mar. 17, 2026

(54) PITCH CONTROLLED WIND TURBINE

(71) Applicant: Vestas Wind Systems A/S, Aarhus N (DK)

(72) Inventors: Peter Bøttcher, Egå (DK); Thomas S. Bjertrup Nielsen, Skødstrup (DK); Søren Steffensen, Brabrand (DK); Mohammed Fajar, Hinnerup (DK); Mikkel Kiilerich Østerlund, Brabrand (DK); Robert Thomas Rudolf, Aarhus C (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/872,860

(22) PCT Filed: Jun. 8, 2023

(86) PCT No.: PCT/DK2023/050139
§ 371 (c)(1),
(2) Date: Dec. 9, 2024

(87) PCT Pub. No.: WO2023/237167
PCT Pub. Date: Dec. 14, 2023

(65) Prior Publication Data
US 2025/0354535 A1 Nov. 20, 2025

(30) Foreign Application Priority Data
Jun. 10, 2022 (DK) .............................. PA 202270307

(51) Int. Cl.
*F03D 1/06* (2006.01)
*F03D 80/70* (2016.01)

(52) U.S. Cl.
CPC ......... *F03D 1/0664* (2023.08); *F03D 80/701* (2023.08); *F05B 2240/50* (2013.01); *F05B 2260/79* (2013.01)

(58) Field of Classification Search
CPC . F03D 7/0224; F03D 1/0664; F05B 2240/917
See application file for complete search history.

(56) References Cited

U.S. PATENT DOCUMENTS 9,017,034 B2 * 4/2015 Fuglsang .............. F03D 1/0658
416/11
9,759,182 B2 * 9/2017 Versavel ................ F03D 13/30
(Continued)

FOREIGN PATENT DOCUMENTS

CN 201810482 U 4/2011
CN 105464900 A 4/2016
(Continued)

OTHER PUBLICATIONS

Danish Patent and Trademark Office, Search and Exam Report, Hansen, Christian Ruegaard, Dec. 12, 2022, 8 Pages.
(Continued)

*Primary Examiner* — Justin D Seabe
(74) *Attorney, Agent, or Firm* — Wood Herron & Evans LLP

(57) ABSTRACT

A first aspect of the invention provides a pitch controlled wind turbine comprising a tower, a nacelle mounted on the tower, a hub mounted rotatably on the nacelle, and at least three wind turbine blades, wherein each wind turbine blade extends between a root end connected to the hub via a pitch mechanism, and a tip end, the wind turbine further comprising at least three blade connecting members, each blade comprising a first connection point and a second connection point, wherein each blade connecting member extends from a first connection point on one wind turbine blade towards a second connection point on a neighbouring wind turbine
(Continued)

blade, where each connection point on a given wind turbine blade is arranged at a distance from the root end and at a distance from the tip end of the wind turbine blade and adjacent a leading edge of the wind turbine blade, and wherein each connecting member is independently moveable in two orthogonal directions at the respective first and second connection points to which it attaches.

18 Claims, 12 Drawing Sheets

(56) References Cited

U.S. PATENT DOCUMENTS

| | | | |
|---|---|---|---|
| 2011/0309625 A1 | 12/2011 | Dehlsen et al. | |
| 2012/0051914 A1* | 3/2012 | Dehlsen ................ | F03D 7/0228 |
| | | | 416/147 |

FOREIGN PATENT DOCUMENTS

| | | | |
|---|---|---|---|
| CN | 105673326 A | 6/2016 |
| EP | 2304227 B1 | 1/2016 |
| EP | 2142795 B1 | 6/2017 |
| KR | 20140089212 A | 7/2014 |

OTHER PUBLICATIONS

Patent Cooperation Treaty, International Searching Authority, Kermani, Nathalie, Aug. 31, 2023, 12 Pages.

* cited by examiner

PITCH CONTROLLED WIND TURBINE

FIELD OF THE INVENTION

The present invention relates to a pitch controlled wind turbine.

BACKGROUND OF THE INVENTION

Wind turbine blades are subject to various loads. The loads typically include aerodynamic forces generated by the wind, including air pressure on the blades, changing wind speed and direction, as well as loads originating from the dead weight of the blade itself.

There is a continued drive to produce larger wind turbine blades, due to the increased energy production that is produced. Yet, as the size of wind turbine blades continues to increase, the loads on the wind turbine blades also continue to increase. The increased loads often require further reinforcement of the blades, however this reinforcement further increases the weight of the blades, with a subsequent further increase in the loads acting on the blades.

SUMMARY OF THE INVENTION

A first aspect of the invention provides a pitch controlled wind turbine comprising a tower, a nacelle mounted on the tower, a hub mounted rotatably on the nacelle, and at least three wind turbine blades, wherein each wind turbine blade extends between a root end connected to the hub via a pitch mechanism, and a tip end, the wind turbine further comprising at least three blade connecting members, each blade comprising a first connection point and a second connection point, wherein each blade connecting member extends from a first connection point on one wind turbine blade towards a second connection point on a neighbouring wind turbine blade, where each connection point on a given wind turbine blade is arranged at a distance from the root end and at a distance from the tip end of the wind turbine blade and adjacent a leading edge of the wind turbine blade, and wherein each connecting member is independently moveable in two orthogonal directions at the respective first and second connection points to which it attaches.

Each wind turbine blade may comprise a leading edge and a leading edge extension, wherein the leading edge extension extends forward of the leading edge, and the first and/or second connection points are located forward of the leading edge on the leading edge extension.

Each wind turbine blade may have a pitch axis about which the blade is rotated by the pitch mechanism relative to the hub, and, when the blade is in an unloaded state, the pitch axis is located aft of the leading edge. The pitch axis may be located outside of a surface of the respective blade and downwind of the blade.

The pitch mechanism connects the root end of the blade to the hub. For example, the pitch mechanism may comprise an outer bearing ring mounted on the hub and an inner bearing ring connected to the blade, or an inner bearing ring mounted on the hub and an outer bearing ring connected to the blade.

Each wind turbine blade may comprise a blade shell defining a suction side and a pressure side around the blade, and the first and second connection points are arranged forward of the leading edge and adjacent the pressure side. The pitch axis may be located outside of the blade and closer to the suction side than the pressure side.

Each of the first and second connection points may comprise a bearing structure.

Each connecting member may be connected via the bearing structure at the first connection point on one wind turbine blade and the bearing structure at the second connection point on the neighbouring wind turbine blade.

Each bearing structure may include a spherical plain bearing.

Each bearing structure may include a pin about which the respective blade connecting member is rotatable.

Each blade connecting member may have an eyelet at one end for receiving the pin at the respective connection point.

The bearing structures of the first and second connection points of each wind turbine blade may be mounted on a unitary connector component of the wind turbine blade.

The bearing structure may permit rotation of each blade connecting member about the respective connection point in at least two orthogonal rotational degrees of freedom.

The wind turbine blades may each comprise an inboard blade part comprising the root end and an outboard blade part comprising the tip end, the inboard blade part and the outboard blade part being connected to each other at a split position, and wherein the connection points on the wind turbine blades are arranged at the split positions.

The inboard blade part may be joined to the outboard blade part by a connection joint, the connection joint comprising a connector, wherein the leading edge extension is integrally formed with the connector.

The connector may be a metallic component, preferably a cast component or a machined component. The connector may be a composite component. The connector may be a co-cured or co-bonded component.

The connector may be coupled to transfer load between a spar cap portion of the inboard blade part and a spar cap portion of the outboard blade part, and is arranged to transfer load from the blade connecting members into the spar cap portion of the inboard blade part.

The connector may connect the inboard blade part and the outboard blade part such that they are rigidly connected together. In other words, the inboard blade part and the outboard blade part do not rotate relative to one another.

The connection points on the wind turbine blades may be arranged at a distance from the root end which is between 10% and 60% of the length of the wind turbine blades from the root end to the tip end, preferably radially inboard of 50% of the length of the respective wind turbine blade from the root end, and more preferably radially inboard of 45% of the length of the respective wind turbine blade from the root end.

The connection points on the wind turbine blades may be arranged at a position where a thickness-to-chord ratio of the wind turbine blade is between 20% and 50%.

The wind turbine may comprise at least three fairings, each fairing arranged to cover the first connection point and/or second connection point.

The wind turbine may further comprise at least three pre-tension members, each pre-tension member connected between one of the blade connecting members and the hub, each pre-tension member arranged to provide pre-tension in the blade connecting member to which it is connected.

The pre-tension members may be connected to a common point arranged at or adjacent the hub.

The hub may comprise a hub member extending from the hub substantially along a direction defined by a rotational axis of the hub, and wherein the pre-tension members are connected to the hub member.

A second aspect of the invention provides a pitch controlled wind turbine comprising a tower, a nacelle mounted on the tower, a hub mounted rotatably on the nacelle, and at least three wind turbine blades, wherein each wind turbine blade extends between a root end connected to the hub via a pitch mechanism, and a tip end, wherein each wind turbine blade comprises: a first blade portion having a shell that defines a suction side, a pressure side, a leading edge, a trailing edge, and a first spar cap portion, the first blade portion further including a first blade portion end surface at one end of the first blade portion; a second blade portion having a shell that defines a suction side, a pressure side, a leading edge, a trailing edge, and a second spar cap portion, the second blade portion further including a second blade portion end surface at one end of the second blade portion, wherein the first blade portion and the second blade portion are configured to be coupled together at the first and second blade portion end surfaces; and a connection joint for coupling the first and second blade portions together, wherein the connection joint includes a connector for connecting to the first blade portion end surface and to the second blade portion end surface, and wherein the pitch controlled wind turbine further comprises at least three blade connecting members, each wind turbine blade comprising a first connection point and a second connection point, wherein each blade connecting member extends from a first connection point on one wind turbine blade towards a second connection point on a neighbouring wind turbine blade, where each connection point on a given wind turbine blade is on the connector of the connection joint of that wind turbine blade.

With this arrangement, the connection joint may be used as a connector for connecting blade portions together whilst concurrently allowing connection of blade connecting members that extend between neighbouring wind turbine blades. This minimises disruption to the wind turbine blade construction, allowing construction to be simpler and reducing discontinuities in the wind turbine blade that would otherwise be required if the location of the blade split and the connection point of the blade connecting members were spaced from one another.

The connector may be adapted to transfer load between the first spar cap portion of the first blade portion and the second spar cap portion of the second blade portion.

The first blade portion may be an inboard blade part comprising the root end, and the second blade portion may be an outboard blade part comprising the tip end, and the connector may be adapted to transfer load from the blade connecting members coupled to the first and second connection points into the first spar cap portion of the inboard blade part.

The connector may include a generally U-shaped connector portion having a first side wall adjacent the first blade portion end surface, a second side wall adjacent the second blade portion end surface, and a base extending between the first and second side walls; wherein the connection joint further comprises a first set of fasteners connecting the first side wall to the first blade portion end surface, a second set of fasteners connecting the second side wall to the second blade portion end surface, and a third set of fasteners extending across the generally U-shaped connector portion and attached to the first and second side walls.

The base may be below a mid-plane of the first and second spar cap portions, and the third set of fasteners may be above the mid-plane of the first and second spar cap portions.

The first set of fasteners and the second set of fasteners may each be between the base and the third set of fasteners.

The connector may be a unitary component having a first row of apertures for receiving the first set of fasteners, a second row of apertures for receiving the second set of fasteners, and one or more third rows of apertures for receiving the third set of fasteners.

A distance from the base to a mid-plane of the first and second spar cap portions may be substantially equal to a distance from each of the fasteners of the third set of fasteners to the mid-plane of the first and second spar cap portions.

The first blade portion may comprise a first set of inserts embedded in the first spar cap portion, and the second blade portion may comprise a second set of inserts embedded in the second spar cap portion; wherein the first set of fasteners connect the first side wall to the first set of inserts and the second set of fasteners connect the second side wall to the second set of inserts.

The pitch controlled wind turbine may further comprise a set of bushings extending across the generally U-shaped connector between the first side wall and the second side wall, wherein each fastener of the third set of fasteners extends through a respective bushing.

The connector may include a first branch for connecting the suction side of the first and second blade portions and a second branch for connecting the pressure side of the first and second blade portions, wherein each of the first and second branches has the generally U-shaped connector portion with the first, second, and third sets of fasteners.

The connector may be a unitary component.

The first and second branches may be connected towards a leading edge and towards a trailing edge. The connector may thus form a ring shape.

The connector may further comprise a leading edge extension. A connecting member may be attached to the respective wind turbine blade at the leading edge extension.

The connector may be a metallic component. The connector may be a cast component or a machined component. The connector may be a composite component. The connector may be a co-cured or co-bonded component.

The wind turbine may comprise at least three fairings, each fairing arranged to cover the connection joint, and/or the first connection point, and/or the second connection point.

The connector may be a first connector, and wherein the connection joint further comprises a second connector separate to the first connector that is located towards the trailing edge of each of the first and second blade portions.

The wind turbine may further comprise at least three pre-tension members, each pre-tension member connected between one of the blade connecting members and the hub, each pre-tension member arranged to provide pre-tension in the blade connecting member to which it is connected.

The pre-tension members may be connected to a common point arranged at or adjacent the hub.

The hub may comprise a hub member extending from the hub substantially along a direction defined by a rotational axis of the hub. The pre-tension members may be connected to the hub member.

The wind turbine may be an upwind wind turbine.

A third aspect of the invention provides a pitch controlled wind turbine comprising a tower, a nacelle mounted on the tower, a hub mounted rotatably on the nacelle, and at least three wind turbine blades, wherein each wind turbine blade extends between a root end connected to the hub via a pitch mechanism, and a tip end;

the wind turbine further comprising at least three blade connecting members, each blade connecting member extending from a connection point on one wind turbine blade towards a connection point on a neighbouring wind turbine blade, where the connection point on a given wind turbine blade is arranged at a distance from the root end and at a distance from the tip end of the wind turbine blade;

wherein each wind turbine blade comprises a leading edge, a leading edge extension, and a pitch axis about which the blade is rotated by the pitch mechanism relative to the hub, wherein the leading edge extension extends forward of the leading edge, and the connection point of the respective wind turbine blade is located forward of the leading edge on the leading edge extension and, when the blade is in an unloaded state, the pitch axis is located aft of the leading edge.

The pitch axis may be located outside of a surface of the respective blade and downwind of the blade.

Each wind turbine blade may be coupled to two of the blade connecting members, each of the two blade connecting members extending from respective connection points of one of the blades. The connection points of the one of the wind turbine blades may be adjacent each other on the same leading edge extension.

The blade connecting members may be connected to the respective wind turbine blades via bearing structures at the respective connection points.

The respective connection of the blade connecting members to one of the wind turbine blades may be independently moveable, preferably the connections are each moveable in two orthogonal directions.

Each wind turbine blade may comprise a blade shell defining a suction side and a pressure side around the blade, and the connection point on the leading edge extension is arranged forward of the leading edge and adjacent the pressure side, preferably the pitch axis is arranged aft of the leading edge and on the suction side. The pitch axis may be located outside of the blade and closer to the suction side than the pressure side.

The wind turbine blades may each comprise an inboard blade part comprising the root end and an outboard blade part comprising the tip end, the inboard blade part and the outboard blade part being connected to each other at a split position, and wherein the connection points on the wind turbine blades are arranged at the split positions.

The inboard blade part may be joined to the outboard blade part by a connection joint, the connection joint comprising a connector, wherein the leading edge extension is integrally formed with the connector.

The connector may be a metallic component, preferably a cast component. The connector may be a machined component. The connector may be a composite component. The connector may be a co-cured or co-bonded component.

The connector may be coupled to transfer load between a spar cap portion of the inboard blade part and a spar cap portion of the outboard blade part, and is arranged to transfer load from the blade connecting members into the spar cap portion of the inboard blade part.

The leading edge extension may have a fairing to smoothly transition the leading edge extension into the leading edge of the wind turbine blade outboard of the leading edge extension.

The connection points on the wind turbine blades may be arranged at a distance from the root end which is between 10% and 60% of the length of the wind turbine blades from the root end to the tip end.

The connection points on the wind turbine blades may be arranged at a position where a thickness-to-chord ratio of the wind turbine blade is between 20% and 50%.

The wind turbine may further comprise at least three pre-tension members, each pre-tension member connected between one of the blade connecting members and the hub, each pre-tension member arranged to provide pre-tension in the blade connecting member to which it is connected.

The pre-tension members may be connected to a common point arranged at or adjacent the hub.

The hub may comprise a hub member extending from the hub substantially along a direction defined by a rotational axis of the hub, and wherein the pre-tension members are connected to the hub member.

The wind turbine may be an upwind wind turbine.

It will be appreciated that any/all of the features of the first, second and third aspects of the invention are compatible and can be combined.

BRIEF DESCRIPTION OF THE DRAWINGS

Embodiments of the invention will now be described with reference to the accompanying drawings, in which.

DETAILED DESCRIPTION OF EMBODIMENT(S)

In this specification, terms such as leading edge, trailing edge, pressure surface, suction surface, thickness, and chord are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction. The term chordwise is used to refer to a direction from the leading edge to the trailing edge, or vice versa.

A pressure surface (or windward surface) of a wind turbine blade is a surface between the leading edge and the trailing edge, which, when the blade is in use, has a higher pressure than a suction surface of the blade.

A suction surface (or leeward surface) of a wind turbine blade is a surface between the leading edge and the trailing edge, which will have a lower pressure acting upon it than that of a pressure surface, when the blade is in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

The term spar cap is used to refer to a longitudinal, generally spanwise extending, reinforcing member of the blade. The spar cap may be embedded in the blade shell or may be attached to the blade shell. The spar caps of the windward and leeward sides of the blade may be joined by one or more shear webs extending through the interior hollow space of the blade. The blade may have more than one spar cap on each of the windward and leeward sides of the blade. The spar caps may form part of a longitudinal reinforcing spar or support member of the blade. In particular, the spar caps may form part of the load bearing structure extending in the longitudinal direction that carries the flapwise bending loads of the blade. The spar cap may comprise spar cap portions either side of a connection joint between portions of the blade.

The term outboard refers to a radial direction from hub of the blade towards the tip end of the blade. The term inboard refers to a radial direction from the tip end towards the hub.

Figure 1:
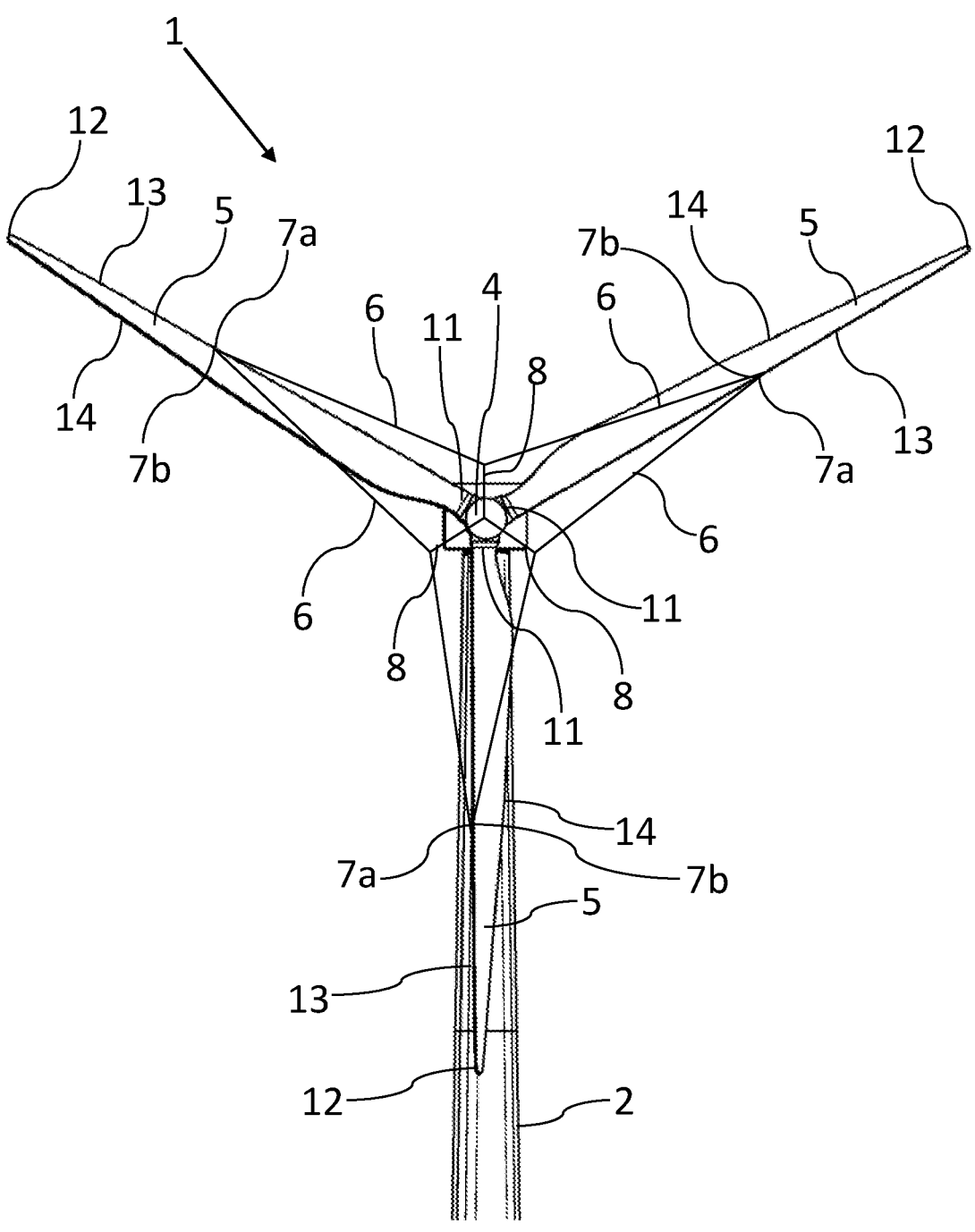
FIG. 1 shows a front view of a wind turbine according to a first example.
Figure 2:
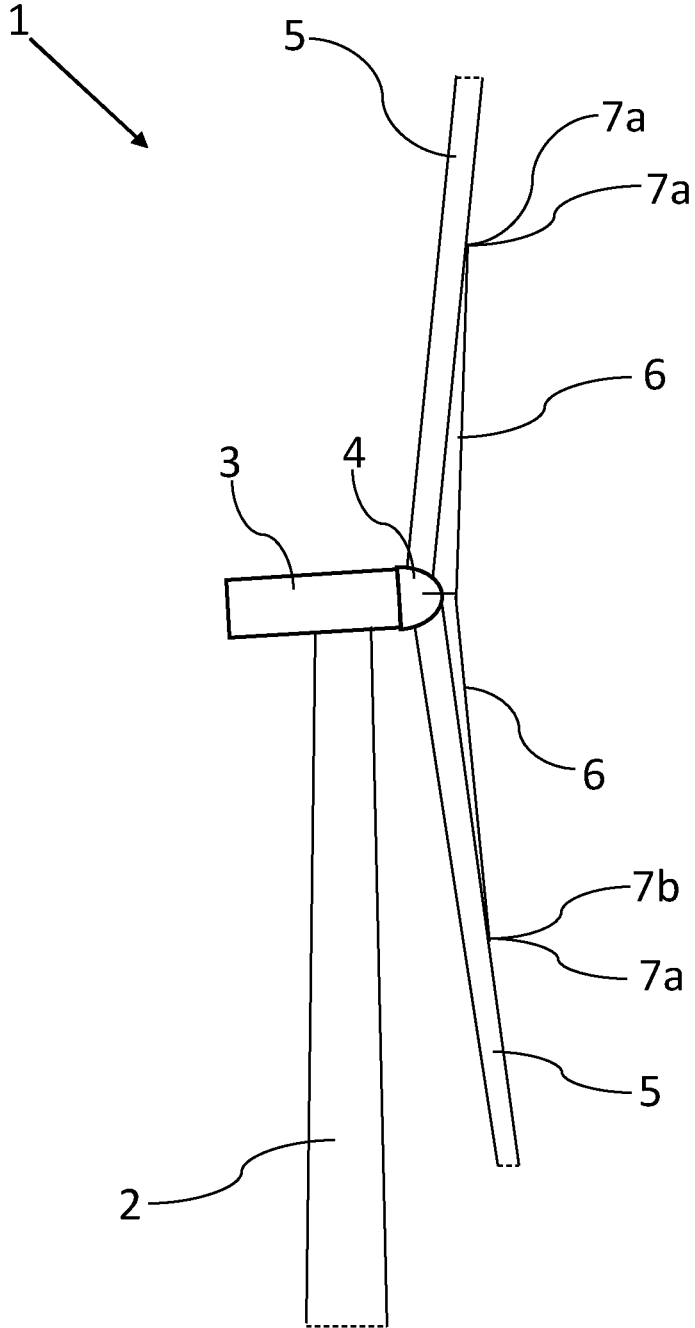
FIG. 2 shows a side view of the wind turbine.

FIGS. 1 and 2 show a pitch controlled wind turbine 1 according to a first example. FIG. 1 is a front view of the wind turbine 1, and FIG. 2 is a side view of the wind turbine 1. The wind turbine 1 comprises a tower 2 and a nacelle 3 mounted on the tower 2. A hub 4 is mounted rotatably on the nacelle 3, and carries three wind turbine blades 5 projecting outwardly from the nacelle 3. While the example shown in FIGS. 1 and 2 has three blades 5, it will be appreciated that other numbers of blades 5 are possible.

When wind blows against the wind turbine 1, the wind turbine blades 5 generate a lift force which causes a generator (not shown) within the nacelle 3 to generate electrical energy.

It will be appreciated that the wind turbine 1 depicted may be any suitable type of wind turbine 1. The wind turbine 1 shown is an upwind wind turbine, although it will be appreciated the wind turbine 1 may be a downwind wind turbine. The wind turbine 1 may be an onshore wind turbine such that the foundation is embedded in the ground, or the wind turbine 1 may be an offshore installation in which case the foundation would be provided by a suitable marine platform.

Figure 6:
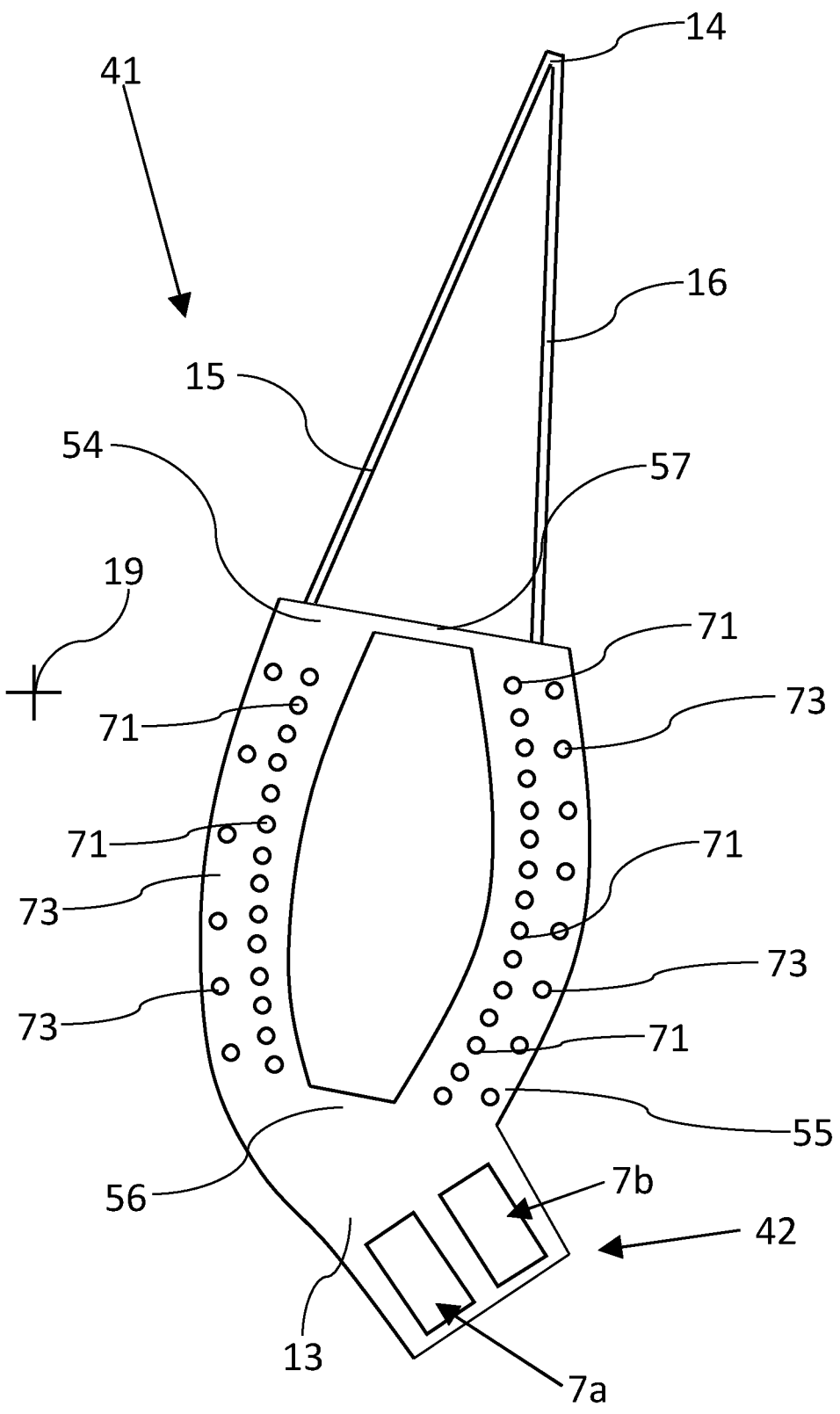
FIG. 6 shows a detailed view of a connector for connecting blade portions.

Three blade connecting members 6 interconnect neighbouring wind turbine blades 5 between connection points 7a, 7b on the wind turbine blades 5 (such as shown in further detail in FIGS. 6 and 7). The connecting members 6 are cables, e.g. steel cables. A pre-tension member 8 extends between one of each of the blade connecting members 6 and a common point arranged at or adjacent the hub 4. In the example shown in FIGS. 1 and 2, the pre-tension members 8 extend to the hub 4. The pre-tension members 8 are configured to provide pre-tension in the blade connecting members 6.

The pre-tensioned blade connecting members 6 cause the wind turbine blades 5 to mutually support each other, in the sense that loads on the wind turbine blades 5, in particular edgewise loads and flapwise loads, are 'shared' among the wind turbine blades 5.

Figure 3:
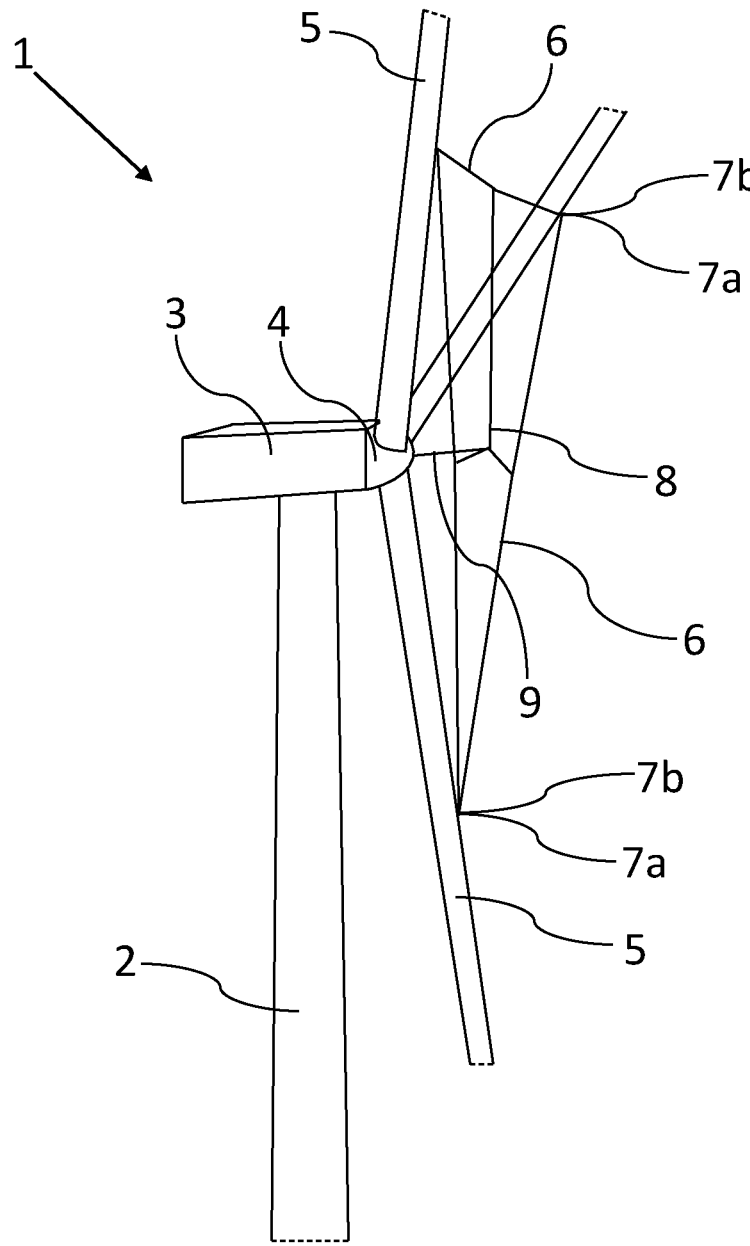
FIG. 3 shows a wind turbine according to a second example.

FIG. 3 is a side view of a pitch controlled wind turbine 1 according to a second example. The wind turbine 1 of FIG. 3 is similar to the wind turbine 1 of FIGS. 1 and 2, and therefore likewise features will not be described in detail here.

In FIG. 3, the pre-tension members 8 are not connected directly to the hub 4. Instead, the pre-tension members 8 are connected adjacent the hub 4, to a hub member 9 which extends from the hub 4 substantially along a direction defined by a rotational axis of the hub 4. As a result, the connection point of the pre-tension members 8 is further from the hub 4 than the example of FIGS. 1 and 2, and thereby further from the positions where the wind turbine blades 5 are connected to the hub 4. This has the consequence that the pre-tension members 8 may also pull the blade connecting members 6 away from the hub 4 and away from the tower 2. This may also cause the wind turbine blades 5 to be pulled in this direction, thereby further reducing edgewise and flapwise loads at the root of the wind turbine blades 5 and securing tower clearance, similar to what is obtained when a coning angle is introduced.

The wind turbine blades 5 have a root end 11 proximal to the hub 4, adapted to be connected to the hub 4 via a pitch mechanism, and a tip end 12 distal from the hub 4. The blades 5 include a leading edge 13 and a trailing edge 14 that extend between the respective root end 11 and tip end 12. The blades 5 include a suction side 15 and a pressure side 16. A thickness dimension of the blade 5 extends between suction side 15 and the pressure side 16.

Each blade 5 may have a cross section which has substantially circular profile near the root end 11. The blade 5 may transition from a circular profile to an aerofoil profile moving from the root end 11 of the blade 5 outboard. The blade 5 may comprise a "shoulder" 28 outboard of the root end 11, which is the widest part of the blade where the blade 5 has its maximum chord. The blade 5 may have an aerofoil profile of progressively decreasing thickness in an outboard portion of the blade. The progressively decreasing thickness may extend from the shoulder 28 to the tip end 12.

Figure 4:
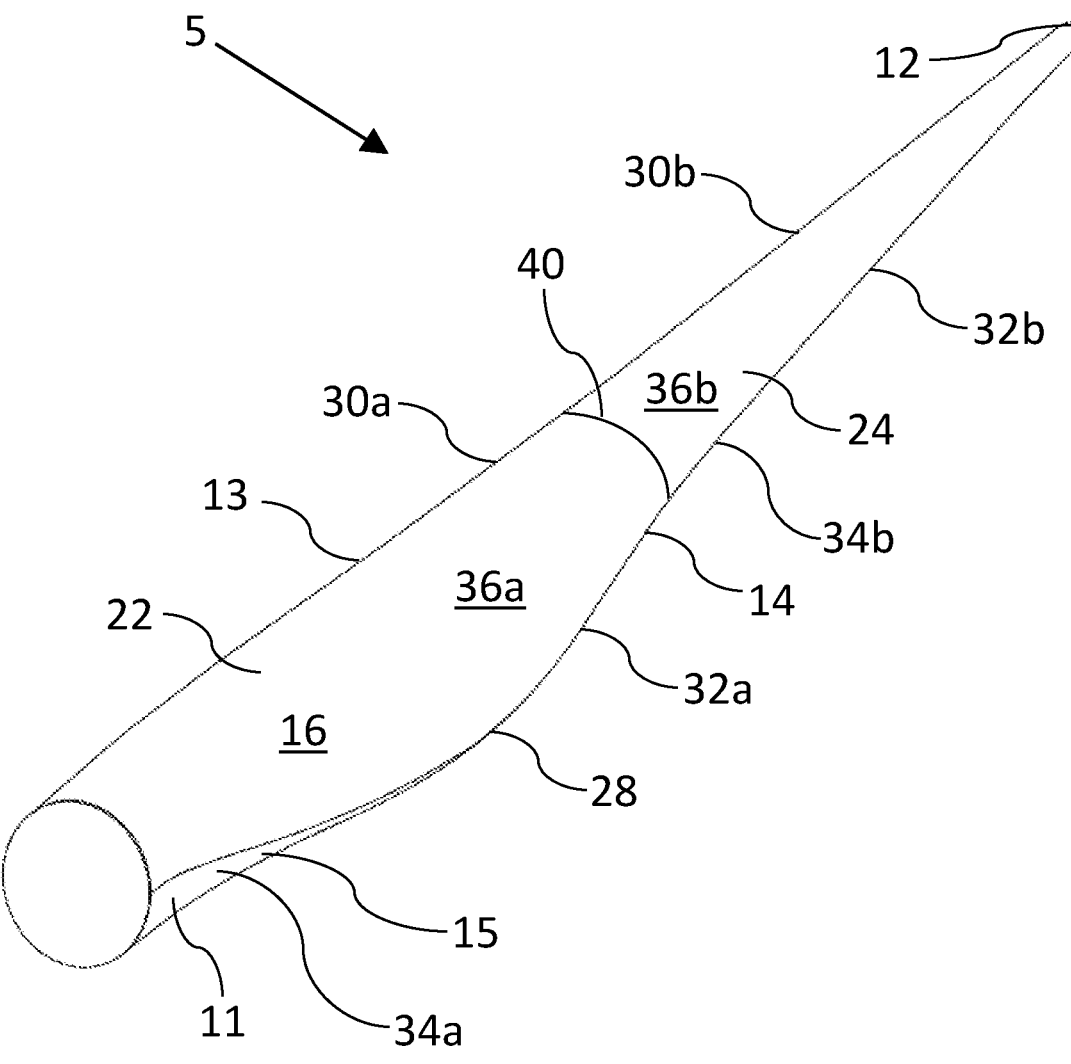
FIG. 4 shows a wind turbine blade.

Each of the blades 5 is a split blade formed of a first blade portion 22 and a second blade portion 24 coupled together, such as shown in FIG. 4. Each blade portion 22, 24 has a shell that defines a respective leading edge 30a, 30b, trailing edge 32a, 32b, suction side 34a, 34b, and pressure side 36a, 36b.

The first portion 22 and second portion 24 of each blade 5 may be connected at a connection joint indicated by connection line 40. The connection line 40 between the first and second blade portions 22, 24 may be a spanwise split, with the connection line 40 being chordwise. The first blade portion 22 extends from the blade root 11 to the connection line 40. The second blade portion 24 extends from the blade connection line 40 to the blade tip 12.

It will be appreciated that the blade 5 may have any number of blade portions 22, 24, with respective connection joints between them.

Figure 5:
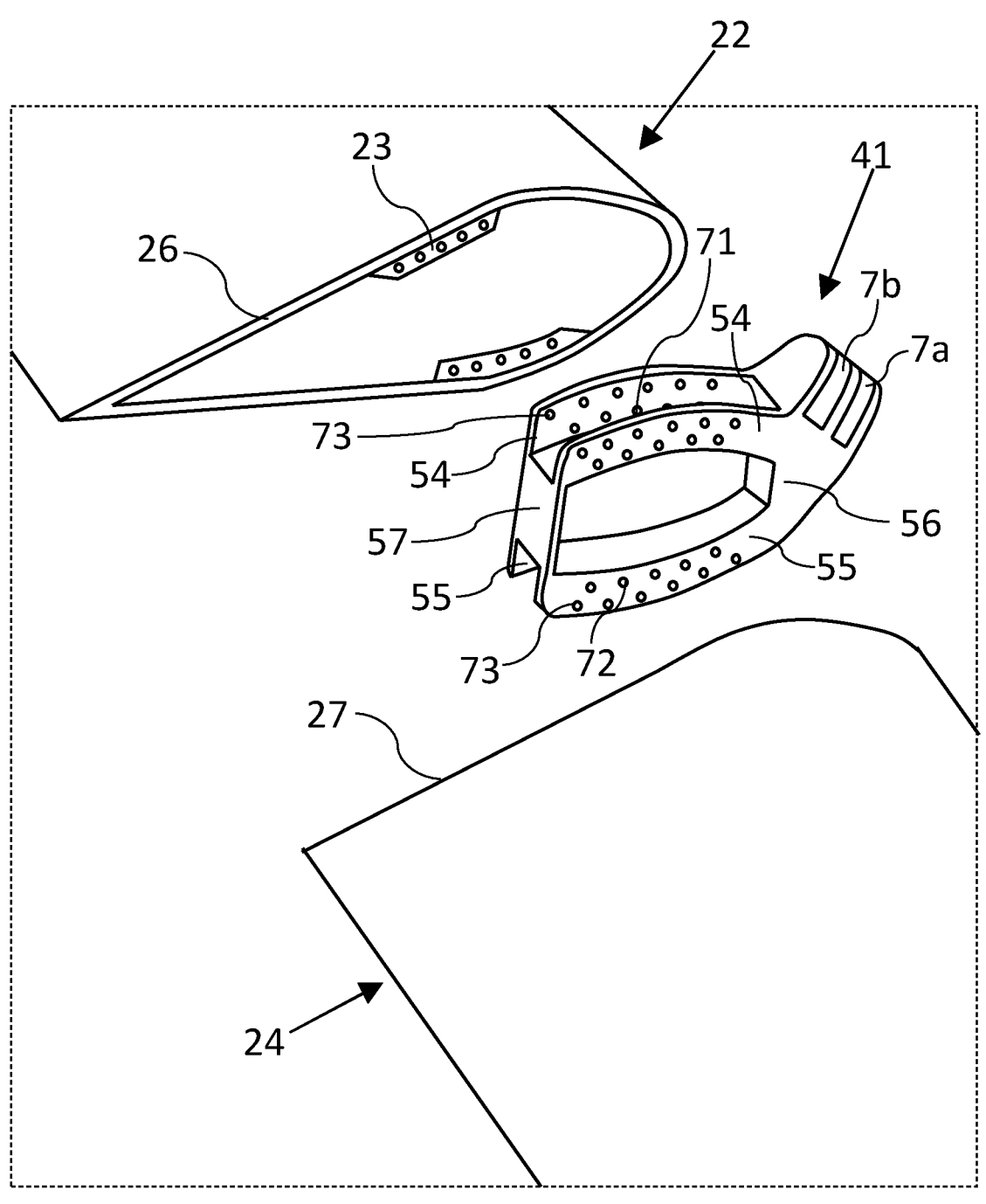
FIG. 5 shows an exploded view of a connection joint.

As previously referred to above, the first and second blade portions 22, 24 are coupled by a connection joint that includes a connector 41, such as shown in FIGS. 5 and 6. In particular, the connector 41 connects a first blade end surface 26 of the first blade portion 22 to a second blade end surface 27 of the second blade portion 24 (as shown more clearly in FIG. 9). As explained in further detail below, the connection points 7a, 7b of the connecting members 6 are on the connector 41 at the connection joint.

The connector 41 is adapted to transfer load between the first blade portion 22 and the second blade portion 24, and in particular between a first spar cap portion 23 of the first blade portion 22 and a second spar cap portion 25 of the second blade portion 24, as will be discussed further in relation to FIG. 9.

The connector 41 is cast metallic component, although it will be appreciated that the connector 41 may be formed of any suitable materials, e.g. composite materials, and produced by any suitable manufacturing technique, e.g. machined, co-cured or co-bonded. The connector 41 is a single unitary connector component 43, although it will be appreciated that the connector 41 may be formed of two or more components in some examples.

In the example shown in FIG. 5, the connector 41 includes a first branch 54 for connecting the suction side 15 of the first and second blade portions 22, 24 and a second branch 55 for connecting the pressure side 16 of the first and second blade portions 22, 24. The first and second branches 54, 55 may be connected by a first link 56 located towards the leading edge 13 of the blade 5 and connected by a second link 57 located towards the trailing edge 14 of the blade 5. In this way, a ring shape is formed by the first branch 54, second branch 55, first link 56 and second link 57. The first and second branches 54, 55 may be integrally formed with the first and second links 56, 57, although it will be appreciated that the first and second branches 54, 55 may be separate components from each other, and/or the first and second links 56, 57. It will be appreciated that the connector 41 may take other forms, for example the second link 57 may be located away from the trailing edge 14 of the blade 5 so as to form a generally 'A' shaped connector.

The connector 41 may extend across substantially the entire chord of the wind turbine blade 5, although preferably the connector 41 extends across only a portion of the chord of the wind turbine blade, such as shown in FIG. 5. This assists in reducing the weight of the connector 41, whilst allowing the connector 41 to be positioned adjacent the spar cap portions 23, 25 of the blade portions 22, 24 that may carry the majority of the loads. The connector 41 may include a plurality of apertures, a first set of apertures 71, a second set of apertures 72, and a third set of apertures 73, only some of which are labelled in FIG. 5 to improve clarity. In this manner, the first and second blade portions 22, 24 may be attached together with sets of fasteners 61, 62, 63 that extend through the holes, as will be described in more detail in relation to FIG. 9.

The connector 41 may extend across any chordwise portion of the blade 5 adjacent the spar cap portions 23, 25, although the example shown in FIG. 5 extends up to the leading edge 13 of the blade 5.

The blade 5 has a pitch axis 19 about which the blade 5 is rotated, by the pitch mechanism, relative to the hub 4. The pitch axis may be located outside of a surface of the respective blade and downwind of the blade. The pitch axis may be located outside of the blade and closer to the suction side 15 of the blade 5 than the pressure side 16. The pitch axis 19 may be located aft of the leading edge 13 and/or adjacent a suction side 15 of the blade 5, for example as shown in FIG. 6. In particular, the pitch axis 19 may be located aft of the leading edge 13 and/or adjacent a suction side 15 when the blade 5 is in an unloaded state. The unloaded state being defined as the state of the blade 5 when there are no wind loads or gravity loads acting on the blade 5.

A leading edge extension 42 may extend forward of the leading edge 13 of the blade 5. The leading edge extension 42 is integrally formed with the connector 41, although it will be appreciated that in alternative examples the leading edge extension 42 may be a separate component to the connector 41.

The leading edge extension 42 includes connection points 7a, 7b that attach to the connecting members 6. In the present example, the leading edge extension 42 includes first and second connection points 7a, 7b, although in alternative examples the leading edge extension 42 may comprise any suitable number of connection points. The first and second connection points 7a, 7b may be arranged forward of the leading edge 13 and adjacent the pressure side 16, such as shown in FIG. 5. This provides additional clearance for the connecting members 6 as the wind turbine blades 5 rotate with the hub 4 about the nacelle 3. In particular, sufficient clearance is provided between the connecting members 6 and the first blade portion 22 when the blades 5 are pitched between 0 degrees and 90 degrees.

It will be appreciated that the connection points 7a, 7b may be adjacent each other on the leading edge extension 42. Alternatively, the connection points 7a, 7b may be spaced from one another. For example, a first connection point 7a may be located further towards the pressure side 16 than the second connection point 7b.

In some examples, the connector 41 may include multiple leading edge extensions 42 integrally formed with the connector 41. The leading edge extensions may be spaced from each other, for example one may be located further towards the pressure side 16 than the other, with each leading edge extension 42 having a respective connection point 7a, 7b.

The connection points 7a, 7b may permit at least some freedom of movement of the connecting members 6 at its respective connection point 7a, 7b. In the example shown in FIG. 7A, the connection points 7a, 7b permit rotation of each blade connecting member 6 about the respective connection point 7a, 7b in two orthogonal rotational degrees of freedom. This allows each connecting member 6 to move independently of each other, thereby reducing constraints on the wind turbine 1.

Figure 7A:
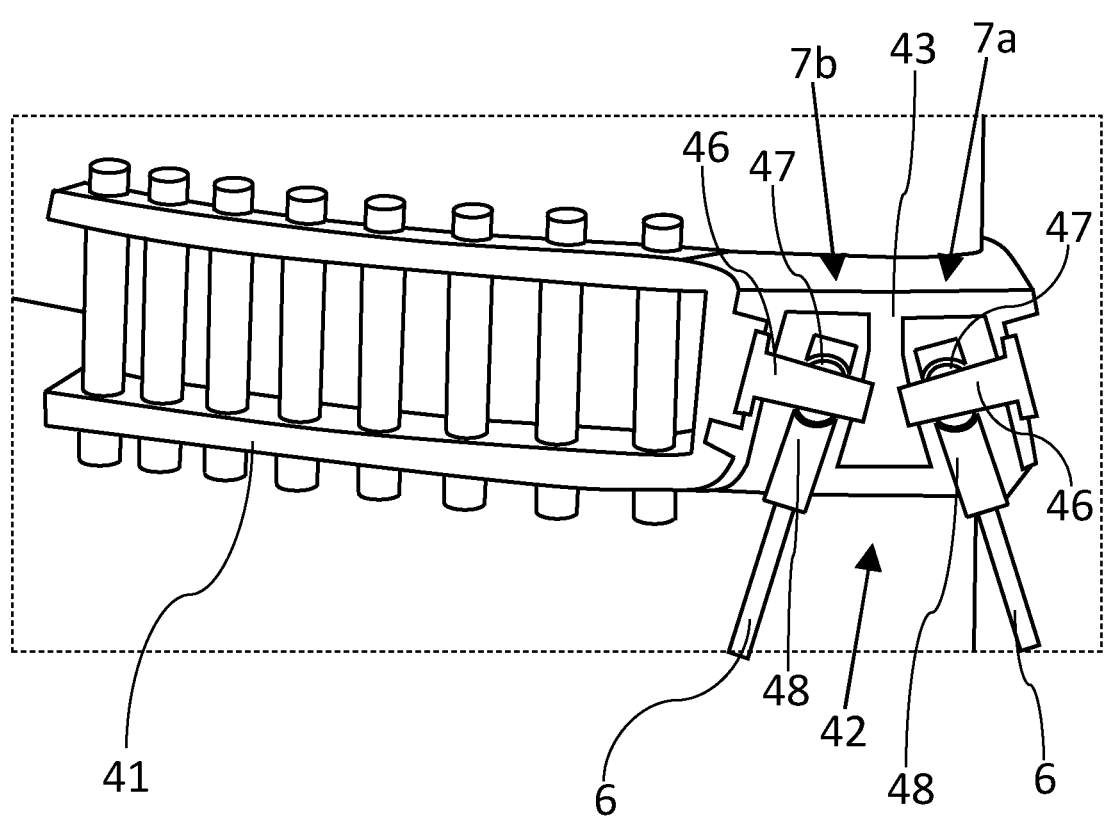
FIG. 7A shows a leading edge extension of the connector.
Figure 7B:
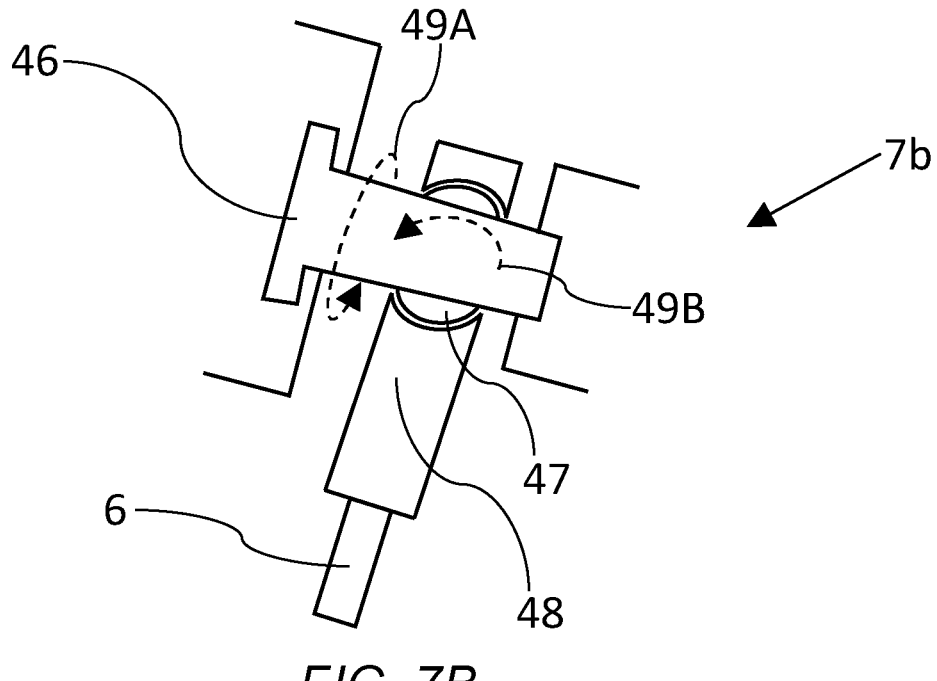
FIG. 7B shows a close up of the connector.

The two orthogonal rotational degrees of freedom may be provided by a bearing structure, for example as shown in FIG. 7B. In this example, the first rotational freedom 49a is provided by a pin 46 of the bearing structure about which a respective blade connecting member 6 is rotatable, and the second rotational freedom 49b provided by a spherical plain bearing 47 between the pin 46 and the respective connecting member 6. However, it will be appreciated that other bearing structures may be applicable.

To assist in attaching the connecting members 6 to the bearing structure, each connecting member 6 may include an eyelet 48 at one end for receiving the respective pin 46.

The bearing structures of the first and second connection points 7a, 7b of each wind turbine blade may be mounted on the connector 41 of the wind turbine blade 5, such as shown in FIG. 7A.

Each connecting member 6 is connected at the first connection point 7a to one wind turbine blade 5 and at the second connection point 7b to a neighbouring wind turbine blade, such as previously described in relation to FIGS. 1 to 3.

Figure 8:
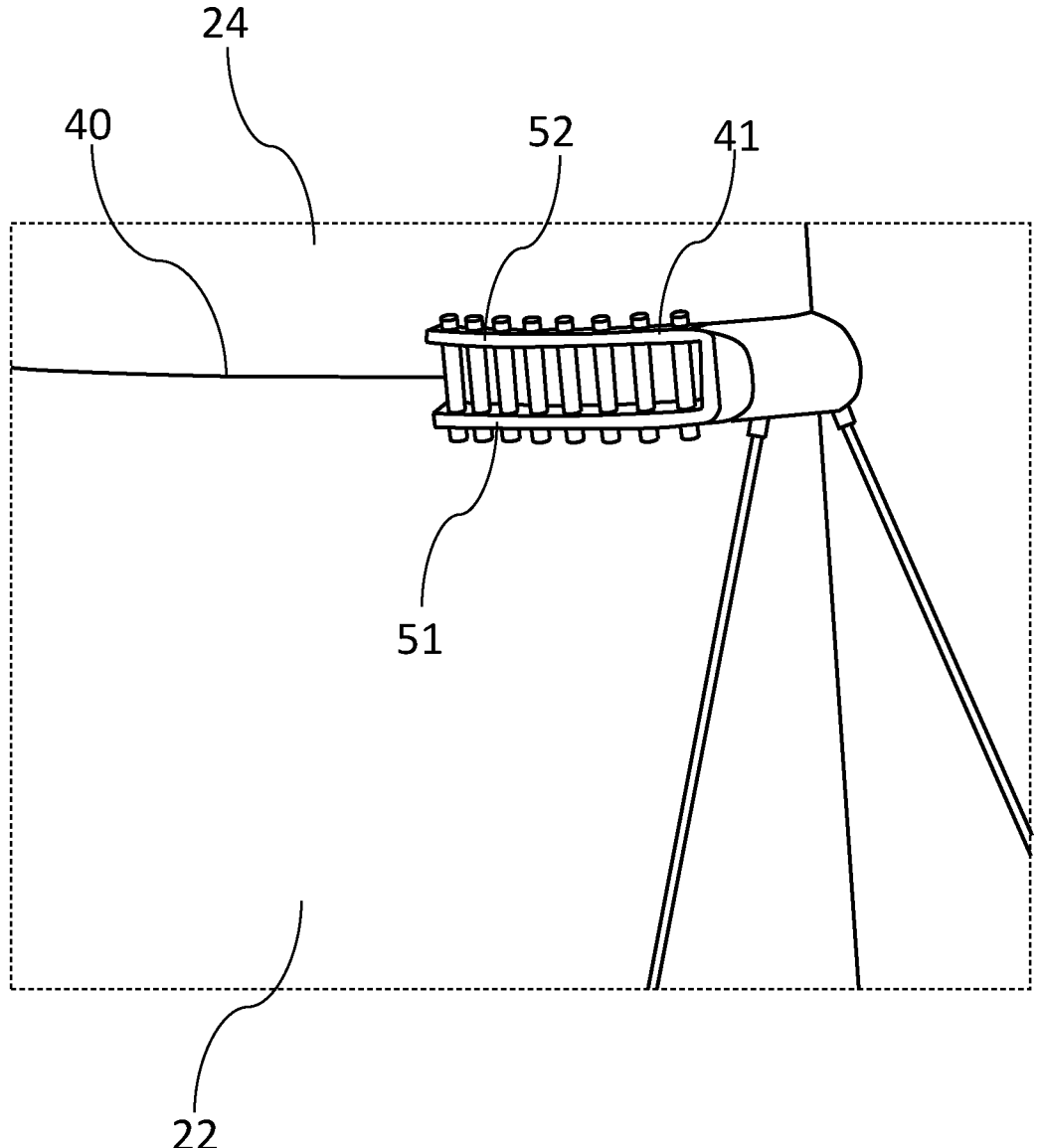
FIG. 8 shows connecting members extending from the connector for interconnecting neighbouring wind turbine blades.

As shown in FIG. 8, the connection joint, indicated by line 40, may be centrally located so as to be equidistant from the spanwise extremities of the connector 41. In particular, the connection joint may be equidistant from first and second side walls 51, 52 of the connector 41 that will now be further described in relation to FIG. 9.

As previously mentioned, the first blade portion 22 includes a first spar cap portion 23, and the second blade portion 24 includes a second spar cap portion 25, with the connector 41 adapted to transfer load between the first spar cap portion 23 of the first blade portion 22 and the second spar cap portion 25 of the second blade portion 24.

Figure 9:
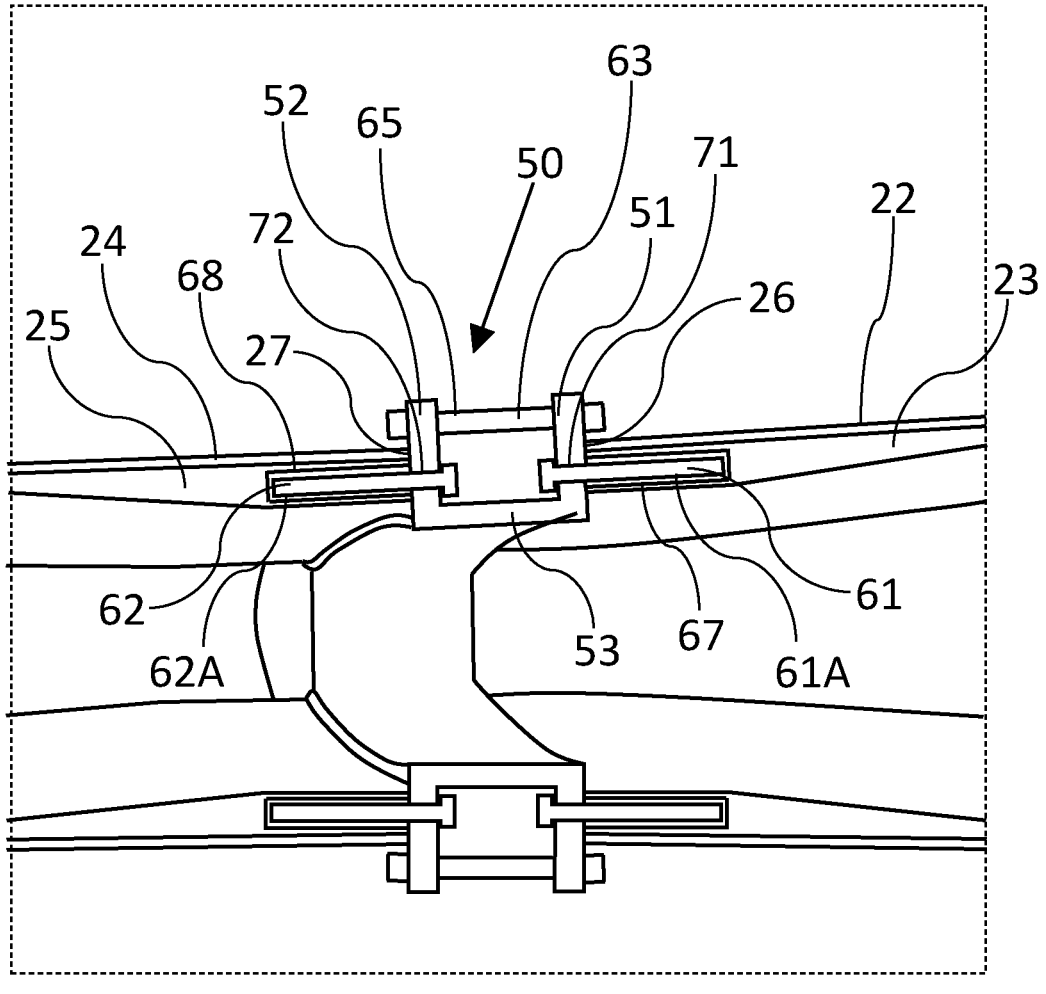
FIG. 9 shows a cross-section of the connection joint.

As shown in FIG. 9, the connector 41 may include a generally U-shaped connector portion 50 having a first side wall 51 adjacent the first blade portion end surface 26, a second side wall 52 adjacent the second blade portion end surface 27, and a base 53 extending between the first and second side walls 51, 52.

A first set of fasteners 61 may extend through the first row of apertures 71 so as to connect the first side wall 51 to the first blade portion end surface 26, a second set of fasteners 62 may extend through the second row of apertures 72 so as to connect the second side wall 52 to the second blade portion end surface 27.

The base 53 may be spaced from a mid-plane of the first and second spar cap portions 23, 25. In the example shown in FIG. 9, the base 53 is below the mid-plane of the first and second spar cap portions 23, 25 (i.e. towards the centre of the blade 5). Positioning the base 53 below the mid-plane of the first and second spar cap portions 23, 25 provides access to the first and second sets of fasteners 61, 62 from the outside of the blade 5, as the side walls 51, 52 extend outwards from the base 53. It will be appreciated that access to the fasteners 61, 62 may be provided without necessarily providing a generally U-shaped connector portion 50, for instance the connector portion 50 may form a closed ring in which an outer end, opposing the base 53, includes one or more apertures through which the fasteners 61, 62 can be accessed.

A third set of fasteners 63 may extend through the third row of apertures 73 on the first and second side walls 51, 52 (the third row of apertures shown most clearly in FIG. 5), so as to extend across the generally U-shaped connector portion 50 and attach to the first and second side walls 51, 52. It will be appreciated that in examples in which the connector portion 50 forms a closed ring, or similar, the third set of fasteners 63 may not be required.

The third set of fasteners 63 may be above the mid-plane of the first and second spar cap portions 23, 25, such as shown in FIG. 9. In particular, each fastener of the third set of fasteners 63 may preferably be located at the same distance from the outer surface of the first and second blade portions 22, 24.

The first and second set of fasteners 61, 62 may be positioned between the base 53 and the third set of fasteners 63. Each of the fasteners of the first and second set of fasteners 61, 62 may be positioned centrally in the respective spar cap portion 23, 25 in a thickness direction of the blade 5. The base 53 and each of the fasteners of the third set of fasteners 63 may be equally spaced from the mid-plane of the first and second spar cap portions 23, 25. In other words, the distance from the base 53 to a mid-plane of the first and second spar cap portions 23, 25 may be substantially equal to a distance from each of the fasteners of the third set of fasteners 63 to the mid-plane of the first and second spar cap portions 23, 25.

In some examples, such as shown in FIG. 9, the first and second set of fasteners 61, 62 may extend into respective inserts 67, 68. Each of the fasteners of the first set of fasteners 61 may extend into an insert 67 having a hole 61A into which the fasteners of the first set of fasteners 61 extend, and each of the fasteners of the second set of fasteners 62 may extend into an insert 68 having a hole 62A into which the fasteners of the second set of fasteners 62 extend.

The inserts 67, 68 may be embedded in the respective first and second spar cap portions 23, 25. The inserts 67, 68 may each include a threaded bushing and each of the fasteners of the first and second set of fasteners 61, 62 may be a threaded fastener that engages the respective threaded bushing. The threaded fastener may include a threaded rod for engagement in the respective threaded bushing and a nut for pre-tensioning the connector against the respective blade portion end surfaces, or may include a bolt with a headed end, or any suitable arrangement that will be apparent to the skilled person. It will be appreciated that the inserts 67, 68 may be any suitable arrangement, for example the inserts 67, 68 may be barrel nuts, the inserts 67, 68 may be t-bolts that attach to a corresponding t-socket, or may form part of a sleeve nut arrangement in which a socket nut attaches to a threaded end of the respective insert 67, 68.

The fasteners of the third set of fasteners 63 may each extend through a respective bushing 65. The bushing 65 may extend between the first and second side walls 51, 52, so as to prevent over tightening of the third set of fasteners 63 and thereby prevent undesirable distortion of the generally U-shaped connector portion 50. The fasteners of the third set of fasteners 63 may be any suitable fastener arrangement, such as a threaded rod with a nut at each end, or a bolt with a headed end adjacent the first or second side wall 51, 52 and a nut adjacent the other of the first and second side walls 51, 52, or a threaded hole in one of the side walls which receives a bolt which extends through a clearance hole in the other side wall.

In some examples, the connection joint may comprise multiple, discrete, connectors 41a, 41b separated in a generally chordwise direction. This may assist in minimising the weight of the connection joint, as the connectors 41a, 41b can support discrete portions of the connection joint, where required, without requiring the connector(s) to span therebetween.

Figure 10A:
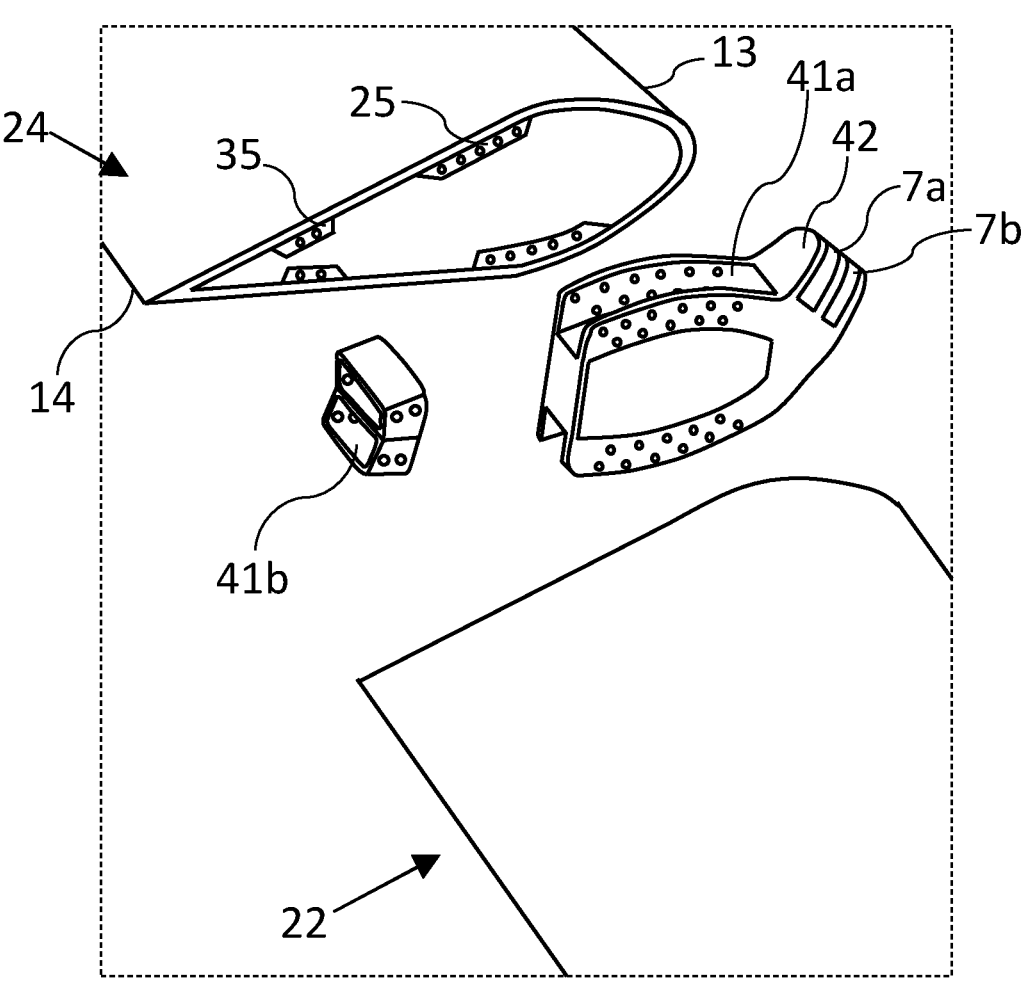
FIGS. 10A and 10B show an alternative example in which the connection joint includes multiple connectors.

FIG. 10A shows an example in which a first connector 41a is provided. The first connector 41a is generally the same as the connector 41 of FIGS. 5 to 9. Accordingly, the first connector 41a is located towards the leading edge 13 of the blade 5, and may be arranged to extend up to the leading edge 13 of the blade 5. Further, the connector 41a may comprise a leading edge extension 42 that includes connection points 7a, 7b that attach to connecting members 6.

Figure 10B:
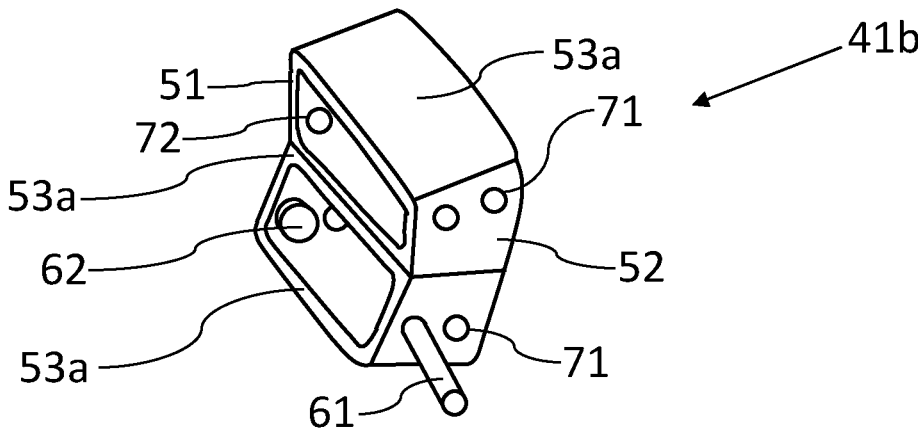
Figure 11A:
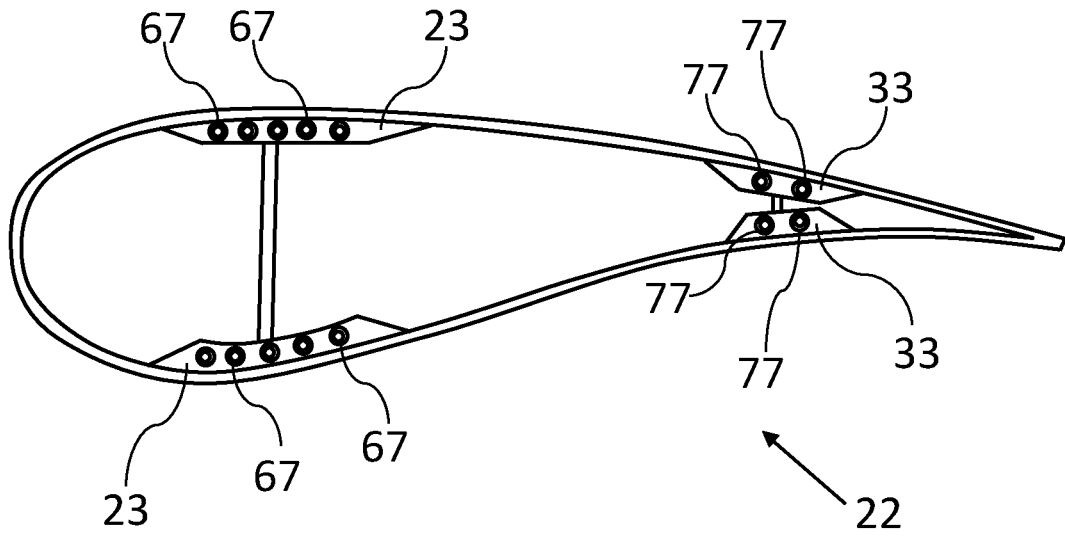
FIGS. 11A and 11B show a cross-section of the blade portions.
Figure 11B:
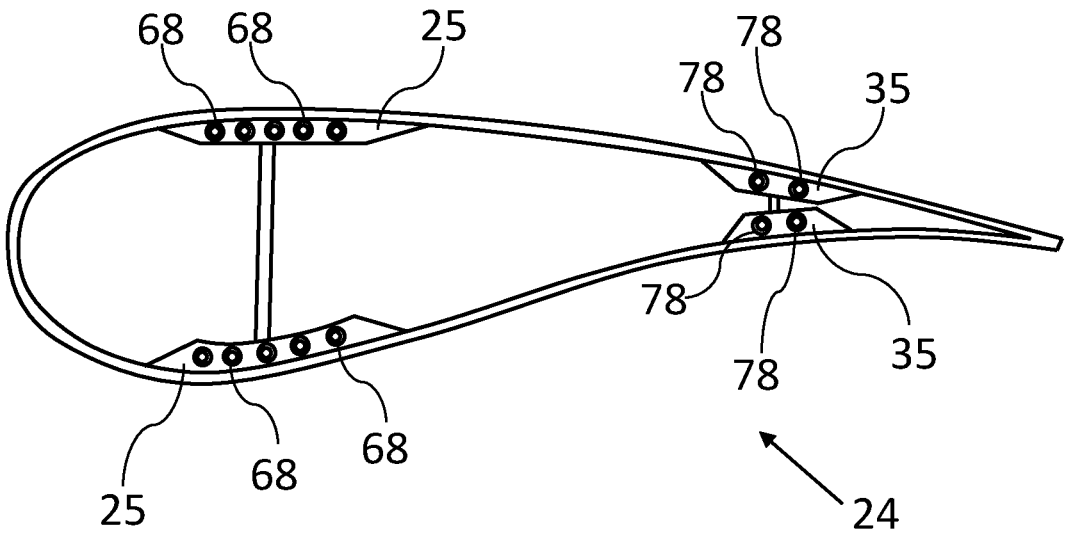

FIGS. 10A and 10B further show a second connector 41b located towards the trailing edge 14 with respect to the first connector 41a. The second connector 41b may connect to third and fourth spar cap portions 33, 35 via fasteners (both spar cap portions 33, 35 shown in FIGS. 11A and 11B). The second connector 41b may include a first set of fasteners 61 (only one of which is shown in FIG. 10B) for extending into the third spar cap portion 33 and a second set of fasteners 62 (only one of which is shown in FIG. 10B) for extending into the fourth spar cap portion 35, with the connector 41b including a plurality of apertures 71, 72 through which the sets of fasteners 61, 62 extend so as to secure the connector 41b to the third and fourth spar cap portions 33, 35. Similar to the arrangement of the first connector 41a, the first and second sets of fasteners 61, 62 may extend into respective inserts 77, 78, such as shown in FIGS. 11A and 11B.

The second connector 41b may include a generally U-shaped connector portion, similar to that described in relation to the connector 41 of FIGS. 5 to 9. Alternatively, such as shown in the example of FIG. 10B, the second connector 41b may include a plurality of supports 53a extending between first and second side walls 51, 52. Accordingly, the second connector 41b may not include a third set of fasteners. This may be achievable due to the small number of fasteners in the first and second set of fasteners 61, 62 (two fasteners into each of the third and fourth spar cap portions 33, 35 in the example of FIGS. 10A and 10B), such that each fastener can be accessed and tightened from the directions of the leading edge 13 and trailing edge 14 of the blade 5, as opposed from requiring access from the suction side 34a, 34b and pressure side 36a, 36b of the blade 5 when a high number of fasteners are in each of the first and second sets of fasteners 61, 62. Alternatively, access to the fasteners may be provided through one or more apertures in one or more of the supports 53a.

As previously referred to, the blade 5 may include third and fourth spar cap portions 33, 35. The second connector 41b is adapted to transfer load between the first blade portion 22 and the second blade portion 24, and in particular between the third spar cap portion 33 of the first blade portion 22 and the fourth spar cap portion 35 of the second blade portion 24. An example of such an arrangement of spar caps 23, 25, 33, 35 integrated into the blade portions 22, 24 is shown in FIGS. 11A and 11B. As previously described in relation to FIG. 9, the first and second spar cap portions 23, 24 may have inserts 67, 68 embedded therein. In addition, the third and fourth spar cap portions 33, 35 may have inserts 77, 78, similar to the inserts 67, 68 of the first and second spar cap portions 23, 24, into which fasteners of the respective first and second sets of fasteners 61, 62 may be engaged.

The fasteners which connect the second connector 41b to the blade portions may have a different size (e.g. a smaller bolt diameter) than the fasteners that connect the first connector 41a to the blade portions. The respective inserts 77, 67 may also have different sizes. The loads near the trailing edge at the second connector 41b will generally be less than the loads across the first connector 41a so material can be saved by appropriate sizing of the fasteners. Similarly, the fasteners at the pressure side and at the suction side may have different sizes to accommodate different loadings.

It will be appreciated that, in alternative examples, the first and second connectors 41a, 41b may be integral so as to extend adjacent the first, second, third and fourth spar cap portions 23, 25, 33, 35.

The connection joint may be covered by a fairing 90, in which case the fairing 90 may provide a surface covering the connection joint that provides minimal worsening of the aerodynamic profile of the two blade portions 22, 24. The fairing 90 may extend from the leading edge 13 of the blade 5 to the trailing edge 14 of the blade 5, so as to substantially cover all of the connection joint, or may extend over only a portion of the connection joint.

Figure 12A:
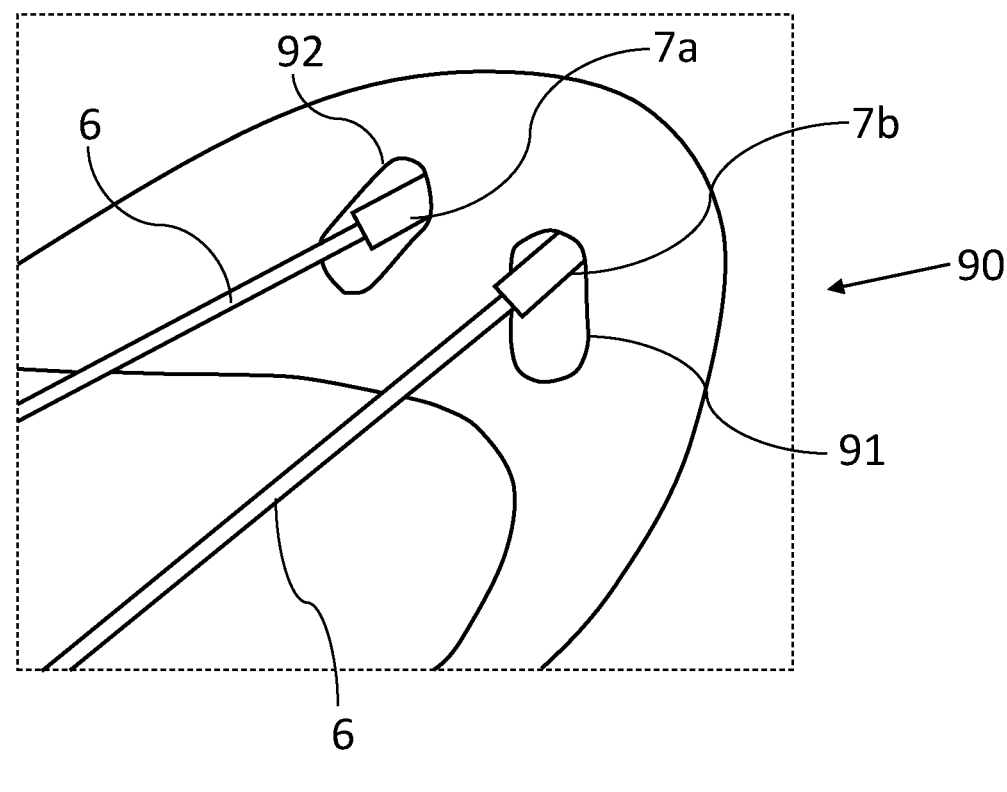
FIGS. 12A and 12B show a fairing of the blade.
Figure 12B:
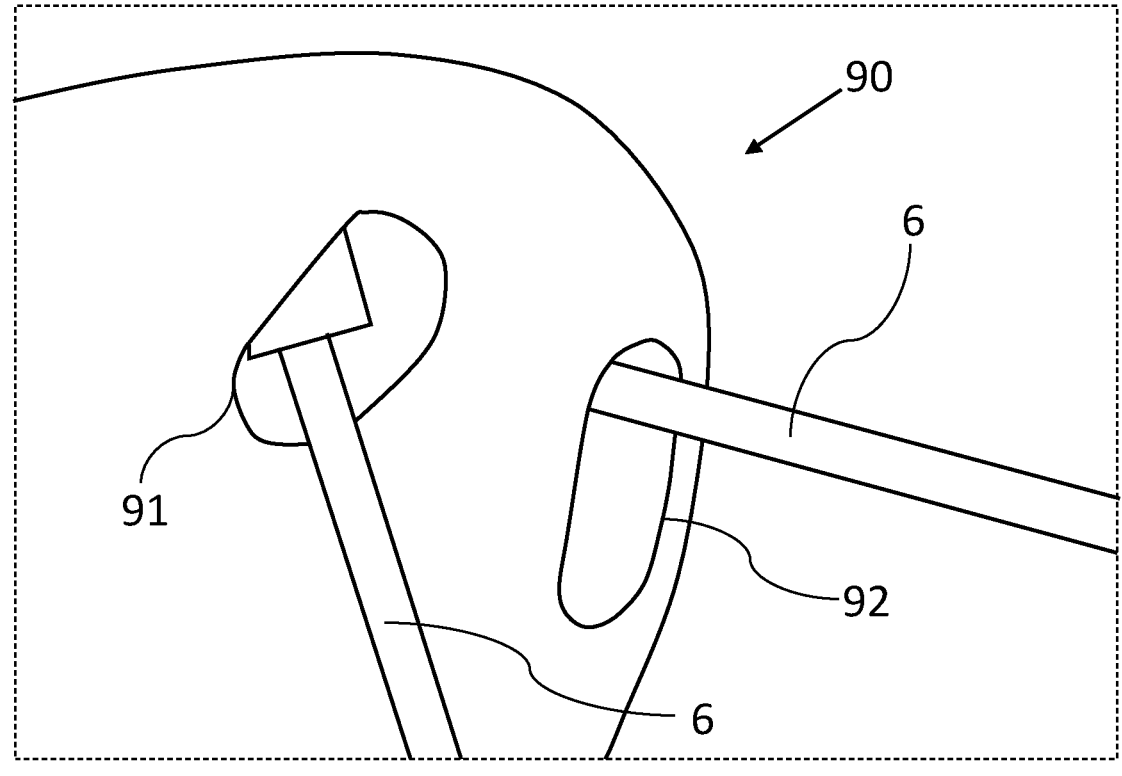

In those examples that include a leading edge extension 42, the fairing 90 may extend to cover the leading edge extension 42, such as shown in FIGS. 12A and 12B. The fairing 90 may be arranged to cover at least one of the first and second connection point 7a, 7b. The fairing 90 may have one or more apertures 91, 92. The apertures 91, 92 may be sized individually for each connecting member 6 and, in particular, sized to account for the possible travel of the connecting member 6 as a result of the freedom of movement of the connecting members 6 at the connection points 7a, 7b.

In the example shown in FIGS. 12A and 12B, the apertures 91, 92 of the fairing 90 are substantially elongate, although it will be appreciated that the apertures 91, 92 may be any suitable size and shape to account for the movement of the connecting members 6 as they extend from the connection points 7a, 7b out through the apertures 91, 92 of the fairing 90.

Although the invention has been described above with reference to one or more preferred embodiments, it will be appreciated that various changes or modifications may be made without departing from the scope of the invention as defined in the appended claims.

The invention claimed is:

1. A pitch controlled wind turbine comprising a tower, a nacelle mounted on the tower, a hub mounted rotatably on the nacelle, and at least three wind turbine blades, wherein each wind turbine blade extends between a root end connected to the hub via a pitch mechanism, and a tip end;

the wind turbine further comprising at least three blade connecting members, each blade comprising a first connection point and a second connection point, wherein each blade connecting member extends from a first connection point on one wind turbine blade towards a second connection point on a neighbouring wind turbine blade, where each connection point on a given wind turbine blade is arranged at a distance from the root end and at a distance from the tip end of the wind turbine blade and adjacent a leading edge of the wind turbine blade; and wherein each connecting member is independently moveable in two orthogonal directions at the respective first and second connection points to which it attaches.

2. The pitch controlled wind turbine of claim 1, wherein each wind turbine blade comprises a leading edge and a leading edge extension, the leading edge extension extends forward of the leading edge, and the first and/or second connection points are located forward of the leading edge on the leading edge extension.

3. The pitch controlled wind turbine of claim 2, wherein each wind turbine blade has a pitch axis about which the blade is rotated by the pitch mechanism relative to the hub, and, when the blade is in an unloaded state, the pitch axis is located aft of the leading edge.

4. The pitch controlled wind turbine of claim 1, wherein each wind turbine blade comprises a blade shell defining a suction side and a pressure side around the blade, and the first and second connection points are arranged forward of the leading edge and adjacent the pressure side.

5. The pitch controlled wind turbine of claim 1, wherein each of the first and second connection points comprises a bearing structure.

6. The pitch controlled wind turbine of claim 5, wherein each connecting member is connected via the bearing structure at the first connection point on one wind turbine blade and the bearing structure at the second connection point on the neighbouring wind turbine blade.

7. The pitch controlled wind turbine of claim 5, wherein each bearing structure includes a spherical plain bearing.

8. The pitch controlled wind turbine of claim 5, wherein each bearing structure includes a pin about which the respective blade connecting member is rotatable.

9. The pitch controlled wind turbine of claim 8, wherein each blade connecting member has an eyelet at one end for receiving the pin at the respective connection point.

10. The pitch controlled wind turbine of claim 5, wherein the bearing structures of the first and second connection points of each wind turbine blade are mounted on a unitary connector component of the wind turbine blade.

11. The pitch controlled wind turbine of claim 5, wherein the bearing structure permits rotation of each blade connecting member about the respective connection point in at least two orthogonal rotational degrees of freedom.

12. The pitch controlled wind turbine of claim 1, wherein the wind turbine blades each comprise an inboard blade part comprising the root end and an outboard blade part comprising the tip end, the inboard blade part and the outboard blade part being connected to each other at a split position, and wherein the connection points on the wind turbine blades are arranged at the split positions.

13. The pitch controlled wind turbine of claim 12, wherein the inboard blade part is joined to the outboard blade part by a connection joint, the connection joint comprising a connector having a leading edge extension that extends forward of the leading edge, wherein the leading edge extension is integrally formed with the connector.

14. The pitch controlled wind turbine of claim 13, wherein the connector is a metallic component.

15. The pitch controlled wind turbine of claim 13, wherein the connector is coupled to transfer load between a spar cap portion of the inboard blade part and a spar cap portion of the outboard blade part, and is arranged to transfer load from the blade connecting members into the spar cap portion of the inboard blade part.

16. The pitch controlled wind turbine of claim 1, wherein the connection points on the wind turbine blades are arranged at a distance from the root end which is between 10% and 60% of the length of the wind turbine blades from the root end to the tip end.

17. The pitch controlled wind turbine of claim 1, wherein the connection points on the wind turbine blades are arranged at a position where a thickness-to-chord ratio of the wind turbine blade is between 20% and 50%.

18. The pitch controlled wind turbine of claim 1, wherein the wind turbine comprises at least three fairings, each fairing arranged to cover the first connection point and/or second connection point.

* * * * *